(12) United States Patent
Cikanek et al.

(10) Patent No.: US 11,220,268 B1
(45) Date of Patent: Jan. 11, 2022

(54) METHOD AND SYSTEM FOR MONITORING A PROPULSIVE EFFORT REQUEST

(71) Applicant: Ford Global Technologies, LLC, Dearborn, MI (US)

(72) Inventors: Susan Cikanek, Northville, MI (US); Bader Badreddine, Dearborn Heights, MI (US); Matthew Allan Herrmann, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/007,294

(22) Filed: Aug. 31, 2020

(51) Int. Cl.
| | | |
|---|---|---|
| *B60W 10/06* | (2006.01) | |
| *B60W 30/188* | (2012.01) | |
| *B60W 30/18* | (2012.01) | |
| *B60W 10/10* | (2012.01) | |
| *B60W 30/14* | (2006.01) | |

(52) U.S. Cl.
CPC ........ *B60W 30/1882* (2013.01); *B60W 10/06* (2013.01); *B60W 10/10* (2013.01); *B60W 30/18063* (2013.01); *B60W 30/14* (2013.01); *B60W 2510/1005* (2013.01); *B60W 2520/30* (2013.01); *B60W 2710/0666* (2013.01)

(58) Field of Classification Search
CPC .. B60W 30/1882; B60W 10/06; B60W 10/10; B60W 30/18063; B60W 2510/1005; B60W 2520/30; B60W 30/14; B60W 2710/066; B60W 2540/10; B60W 30/188
See application file for complete search history.

(56) References Cited

U.S. PATENT DOCUMENTS

| | | | |
|---|---|---|---|
| 2015/0134168 A1 | 5/2015 | Kawakami et al. | |
| 2015/0266479 A1* | 9/2015 | Blakeway | B60W 50/082 477/92 |
| 2019/0382015 A1 | 12/2019 | Niu et al. | |
| 2020/0166128 A1 | 5/2020 | Komuro | |
| 2020/0324756 A1* | 10/2020 | Bolthouse | F02D 41/065 |

\* cited by examiner

*Primary Examiner* — Roger L Pang
(74) *Attorney, Agent, or Firm* — David Kelley; McCoy Russell LLP

(57) ABSTRACT

Methods and systems for monitoring and determining a propulsion request are described. In one example, the propulsion request is evaluated according to two separate plausibility checks. The plausibility checks may include comparing a monitor propulsion request against the propulsion request and comparing the monitor propulsion request against a wheel torque.

5 Claims, 7 Drawing Sheets

US 11,220,268 B1

METHOD AND SYSTEM FOR MONITORING A PROPULSIVE EFFORT REQUEST

FIELD

The present description relates generally to methods and systems for monitoring and determining a propulsive effort request for a vehicle.

BACKGROUND/SUMMARY

A vehicle may include a device for requesting propulsive effort of a vehicle. For example, a vehicle may include a propulsive effort pedal that may be applied or released via an operator. Propulsive effort may be determined in part from a position of the propulsive effort pedal. The propulsive effort determined from the propulsive effort pedal may be in the form of a driver demand torque or a driver demand power.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
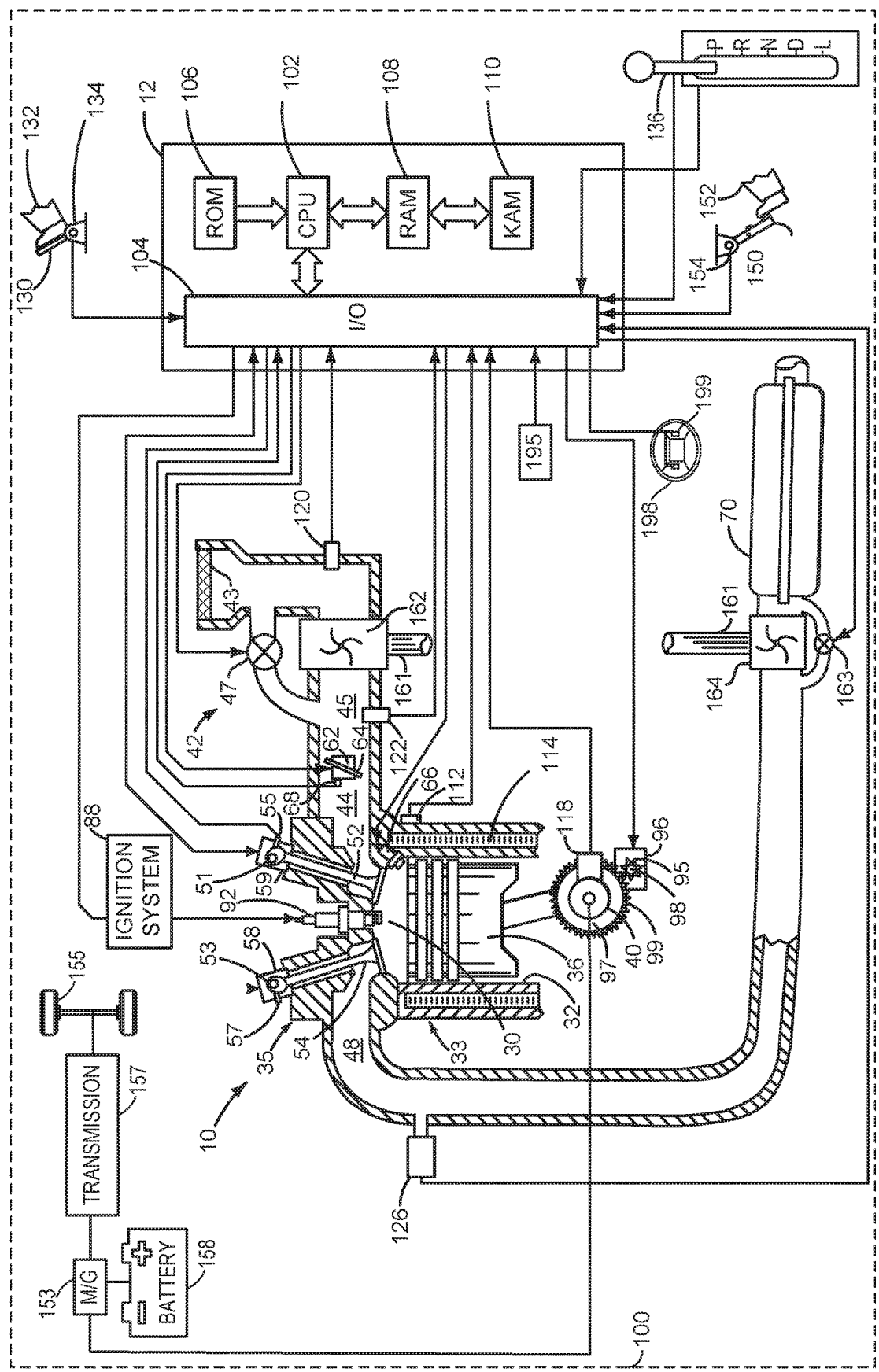
FIG. 1 is a schematic diagram of an engine system coupled in a hybrid vehicle system.
Figure 2:
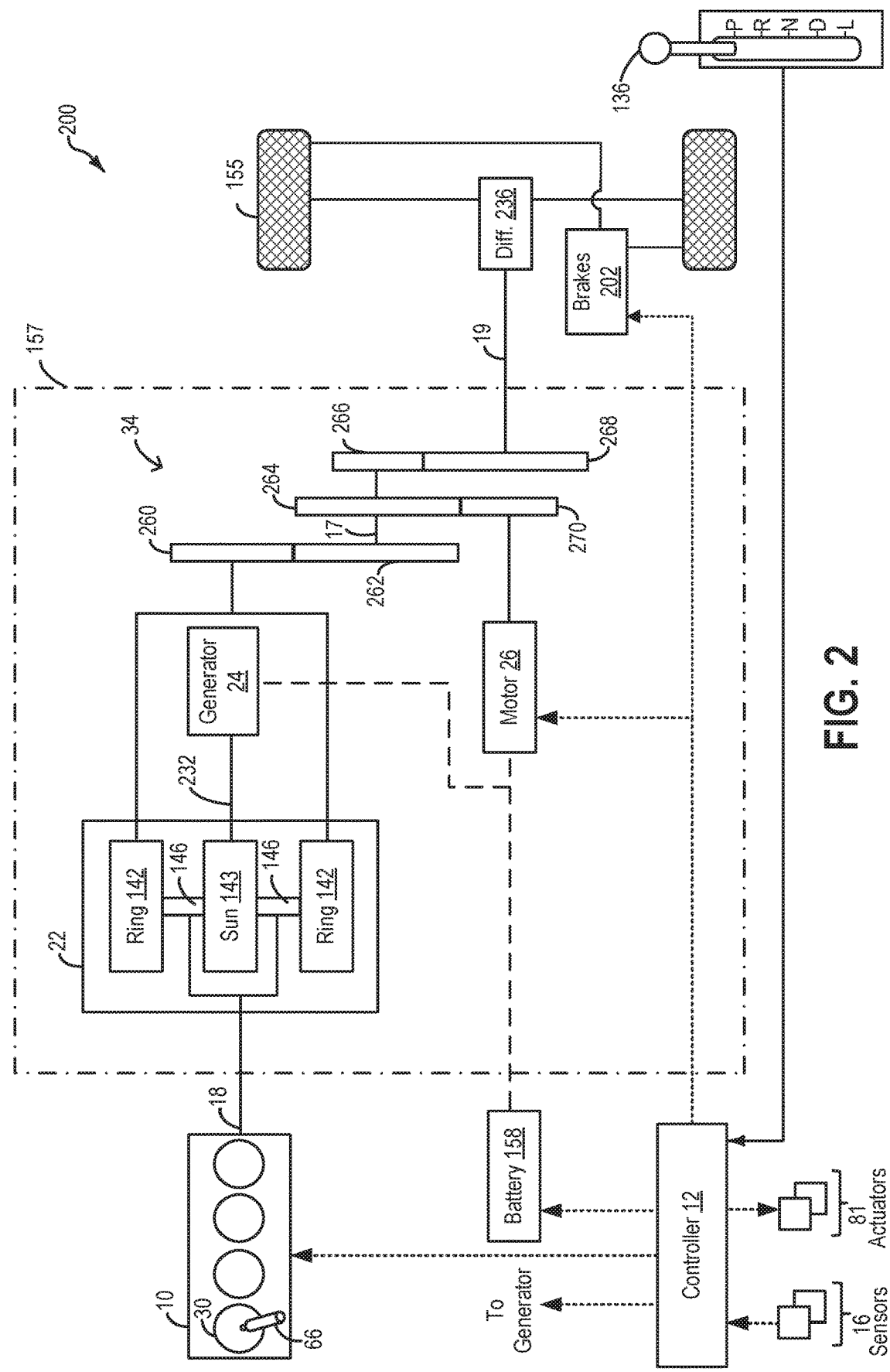
FIG. 2 shows an example powertrain of a hybrid vehicle system.

The following description relates to systems and methods for determining and monitoring propulsive effort requests for a vehicle. The vehicle may be a hybrid vehicle as shown in FIGS. 1 and 2. Alternatively, the vehicle may be an electric vehicle or a vehicle that includes only an internal combustion engine as a propulsion source. The propulsive effort request may be monitored and determined according to the sequence of FIG. 3. The sequence of FIG. 3 may be generated via the method of FIGS. 4-7 and the system of FIGS. 1 and 2. The method of FIGS. 4-7 monitors a propulsive effort request and may adjust powertrain output torque or power according to the propulsive effort request.

A propulsive effort request may be generated according to a position of a propulsive effort pedal. However, in some vehicles the propulsive effort request may also be influenced by operating states of other vehicle systems. For example, a propulsive effort request may be influenced by a position of a gear selector, vehicle operating mode (e.g., cruise control, torque control, hill descent, etc.), torque blending strategies, etc. A system may not include redundant sensors or actuators for verifying states of all devices that may influence determination of a propulsive effort request. Therefore, it may be desirable to provide a way of determining and monitoring a propulsive effort request so that vehicle performance matches expectations.

In one example, the above issue may be addressed by a method for operating a vehicle, comprising: evaluating a propulsive effort request according to a first plausibility check; evaluating the propulsive effort request via a second plausibility check when the first plausibility check indicates a possibility of the propulsive effort request being degraded; and constraining powertrain output to less than a first predetermined amount in response to results of the first plausibility check.

By evaluating a propulsion request according to a first plausibility check and a second plausibility check, it may be possible to reduce a possibility of generating powertrain output that may not be expected by a vehicle operator. In particular, the propulsion request may be evaluated according to a first plausibility check to determine if the propulsion request is greater than or less than a monitor propulsive effort request by more than a predetermined amount. Further, the second plausibility check may include comparing a wheel torque against the monitor propulsive effort request. If the propulsion request and the wheel torque are within expected ranges, the propulsion request may be delivered via the powertrain. Otherwise, the powertrain may be limited to generating a creep torque.

The approach described herein may have several advantages. In particular, the approach may reduce a possibility unintended powertrain output. Further, the approach includes two distinct evaluations to improve confirmation of determining whether or not a propulsion request is expected to be valid. In addition, the approach may be implemented without redundant sensors so that system costs may be controlled.

Referring to FIG. 1, an internal combustion engine 10 is shown. Engine 10 may be included in a drivetrain of a vehicle 100 configured for on-road propulsion, such as the powertrain of FIG. 2. In one example, vehicle 100 is a hybrid electric vehicle. However, vehicle 100 may be an electric vehicle or a conventional vehicle that includes only an internal combustion engine as a source of propulsive effort.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive operator input via a transmission lever or gear shift selector 136. Selector 136 may be manually shifted between different gear options by the vehicle operator based on a desired transmission output and a desired direction of vehicle motion. In one example, as depicted, the operator may have the following operator selectable options: park (P), reverse (R), neutral (N), drive (D), and low (L). In the depicted example, the shift selector is known as a PRNDL lever, corresponding to the different options. In one example, when in park or neutral, substantially no torque may be transmitted from the engine to the transmission output. When in park, the vehicle is immobile. In drive, an electronic controller can control the transmission to select any available forward gear ratios, enabling the vehicle to move in a forward direction. In reverse, a single reverse gear is selected, enabling the vehicle to move in a backward or reverse direction. In low, only a lower set of forward gear ratios can be selected by the electronic controller. In some examples, there may be a low 1 and low 2 option. Shift selector 136 may be located on a steering column or between driver and passenger seats of the vehicle. In addition, in some examples, the transmission may not include fixed gear ratios. Rather, the transmission may include a planetary gear set. Nevertheless, gears may be simulated in such a system via maps that control powertrain output torque or power. Manual selection of forward gears may be permitted via paddle shifters 199. Paddle shifters 199 may be coupled to steering wheel 198.

The controller 12 receives signals from the various sensors of FIG. 1 and employs the various actuators of FIG. 1, such as throttle 62, fuel injector 66, spark plug 91, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an internal combustion engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a first clutch 156 is provided between crankshaft 40 and electric machine 153. Electric machine 153 is shown directly coupled to transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. In other examples, clutches need not be included. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

FIG. 2 depicts a hybrid propulsion system 200 for a vehicle. In the depicted embodiment, the vehicle is a hybrid electric vehicle (HEV), such as vehicle 100 of FIG. 1. Propulsion system 200 includes an internal combustion engine 10 (such as engine 10 of FIG. 1) having a plurality of cylinders 30. Fuel may be provided to each cylinder of engine 10 from a fuel system (not shown) including one or more fuel tanks, one or more fuel pumps, and injectors 66.

Engine 10 delivers power to transmission 157 via torque input shaft 18. In the depicted example, transmission 157 is a power-split transmission (or transaxle) that includes a planetary gearset 22 and one or more rotating gear elements. Transmission 157 further includes an electric generator 24 and an electric motor 26. The electric generator 24 and the electric motor 26 may also be referred to as electric machines as each may operate as either a motor or a generator. Torque is output from transmission 157, for propelling vehicle tractions wheels 155, via a power transfer gearing 34, a torque output shaft 19, and differential-and-axle assembly 236.

Generator 24 is drivably connected to electric motor 26 such that each of electric generator 24 and electric motor 26 may be operated using electric energy from an electrical energy storage device, herein depicted as battery 158. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 232, as further elaborated below.

Electric motor 26 may be operated in a regenerative mode, that is, as a generator, to absorb energy from vehicle motion and/or the engine and convert the absorbed kinetic energy to an energy form suitable for storage in battery 158 Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 142, a sun gear 143, and a planetary carrier assembly 146. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 155 via power transfer gearing 34 including one or more meshing gear elements 260-268. In one example, the meshing gear elements 260-268 may be step ratio gears wherein carrier assembly 46 may distribute torque to the step ratio gears. The step ratio gears may include, for example, a neutral gear, a reverse gear, and one or more forward gears. Gear elements 262, 264, and 266 are mounted on a countershaft 17 with gear element 264 engaging an electric motor-driven gear element 270. Electric motor 26 drives gear element 270, which acts as a torque input for the countershaft gearing. In this way, the planetary carrier 146 (and consequently the engine and generator) may be coupled to the vehicle wheels and the motor via one or more gear elements. An operator may select a transmission gear via actuation of gear shift selector 136, as discussed at FIG. 1.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 155 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 143, producing a reaction torque to the engine. Consequently, torque is output by the planetary carrier to gears 262, 264, 266 on countershaft 17, which in turn delivers the power to wheels 155. Optionally, the engine can be operated to output more torque than is needed for propulsion, in which case the additional power is absorbed by the generator (in generating mode) to charge the battery 158 or supply electrical power for other vehicle loads.

In another example, the vehicle may be driven in a second engine-on mode, herein also referred to as an "assist" mode. During the assist mode, engine 10 is operated and used as the primary source of torque for powering wheels 155 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 155. As such, during the engine-off mode, no fuel may be injected into engine 10 irrespective of whether the engine is spinning or not. The "engine-off" mode may be employed, for example, during braking, low speeds, while stopped at traffic lights, etc. Specifically, motor power is delivered to gear element 270, which in turn drives the gear elements on countershaft 17, and thereon drives wheels 155.

Propulsion system 200 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. Input may also be received via the shift selector 136, a brake pedal, a propulsive effort pedal, a vehicle speed sensor, and the other sensors of FIG. 1. The various actuators may include, for example, the gear set, cylinder fuel injectors (not shown), an air intake throttle coupled to the engine intake manifold (not shown), and the actuators of FIG. 1. Controller 12 may receive input data from the various sensors, process the input data, and trigger the actuators in response to the processed input data based on instruction or code programmed therein corresponding to one or more control routines. Example control routines are described herein with regard to FIGS. 4-7.

For example, a frictional force may be applied to wheels 155 by engaging friction wheel brakes 202. In one example, friction wheel brakes 202 may be engaged in response to the driver pressing their foot on a brake pedal (not shown). A brake control module of the controller 12 may adjust the brake torque applied to the wheels via the wheel brakes in concert with an engine brake torque from engine 10 and/or a motor brake torque from motor 26 in order to apply a net amount of brake torque on the wheels that decelerates the vehicle's reverse motion at a target rate of deceleration. In the same way, the frictional force may be reduced to wheels 155 by disengaging wheel brakes 202 in response to the driver releasing their foot from a brake pedal, or the vehicle reverse speed falling below a threshold. As a further example, vehicle brakes may apply a frictional force to wheels 155 as part of an automated engine stopping procedure, and release the frictional force as part of an engine restart procedure. It will be appreciated that in further embodiments, operator controls that combine brake, accelerator, and vehicle direction selection may be combined into a joystick-like control.

Thus, the system of FIGS. 1 and 2 provides for a vehicle system, comprising: a source of propulsive effort (e.g., an engine or an electric machine); a propulsive effort input device (e.g., a propulsive effort pedal); and a controller with computer readable instructions stored on non-transitory memory that when executed cause the controller to: judge that a propulsive effort request is less than a first predetermined amount; incrementing a first timer after judging that the propulsive effort request is less than the first predetermined amount; judge that a wheel torque is less than a second predetermined amount in response to a value of the first timer exceeding a first threshold amount; incrementing a second timer after judging that the wheel torque is less than the second predetermined amount; and constraining a powertrain output to less than a third predetermined amount in response to a value of the second timer exceeding the second predetermined amount. The system further comprises a transmission gear selector. The system includes where the controller includes further instructions that cause the controller to: adjust the propulsive effort request in response to a position of the transmission gear selector. The system includes where the third predetermined amount is a creep torque.

In some examples, the system further comprises additional instructions that when executed by the controller cause the controller to: adjust the value of the first timer to zero in response to judging that the propulsive effort request is not less than the first predetermined amount. The system further comprises additional instructions that when executed by the controller cause the controller to: adjust the value of the second timer to zero in response to judging that the wheel torque is not less than the second predetermined amount. The system further comprises additional instructions that when executed by the controller cause the powertrain output to follow the propulsive effort request when the propulsive effort request is not judged to be less than the first predetermined amount.

Figure 3:
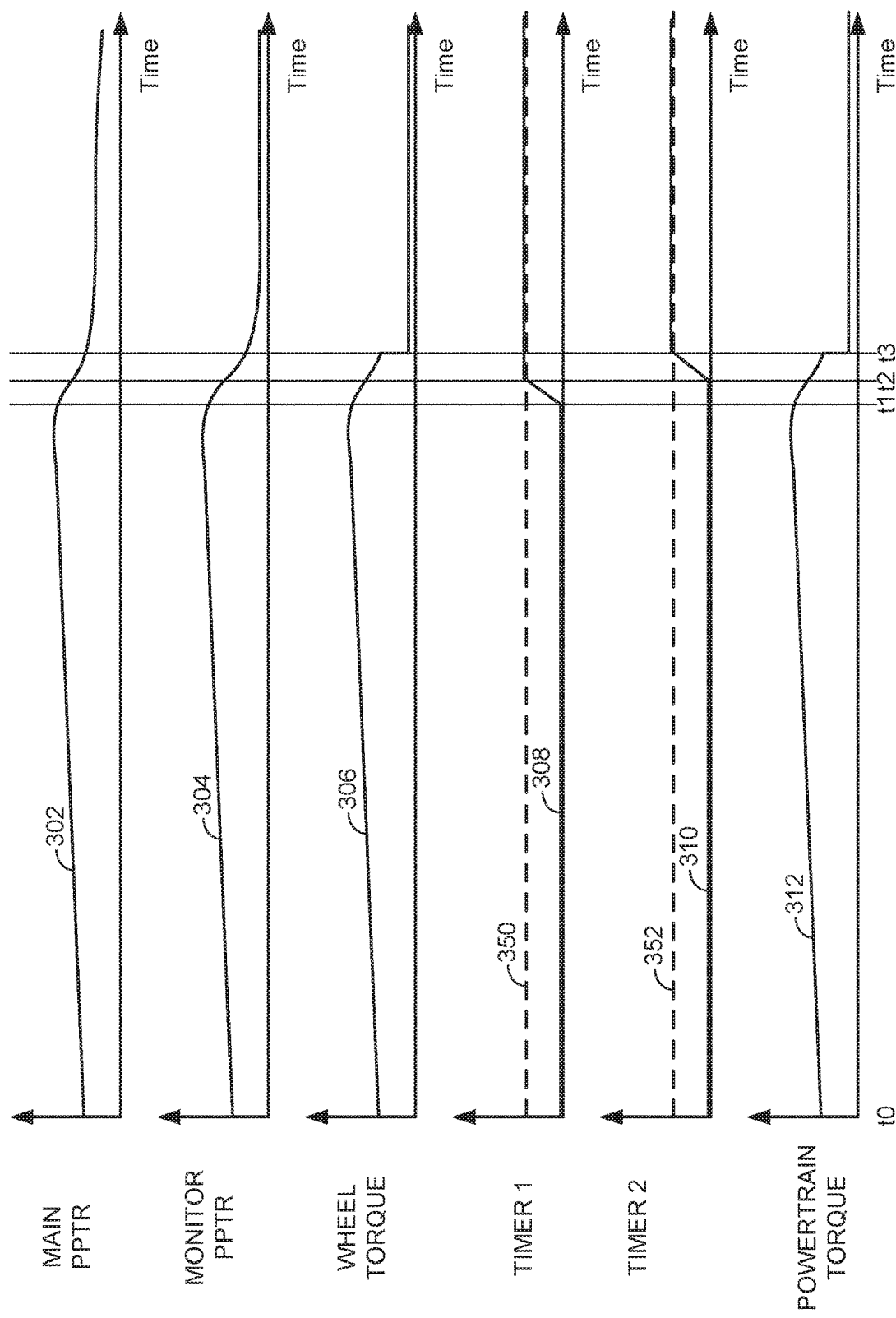
FIG. 3 shows an example operating sequence for the system of FIGS. 1 and 2 according to the method of FIGS. 4-7.
Figure 4:
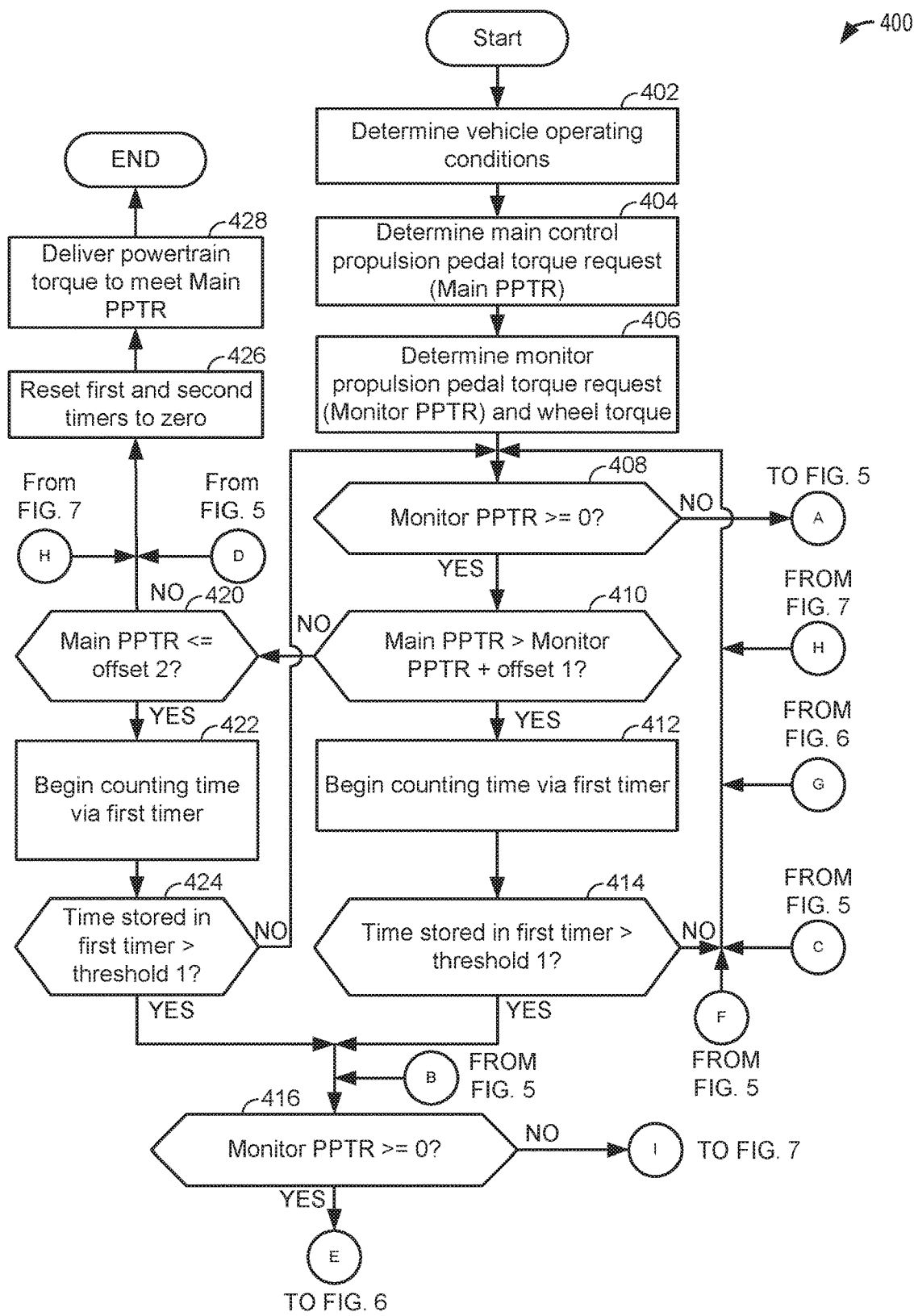
FIG. 4-7 shows a high level flowchart of an example method for determining and monitoring a vehicle torque request.
Figure 5:
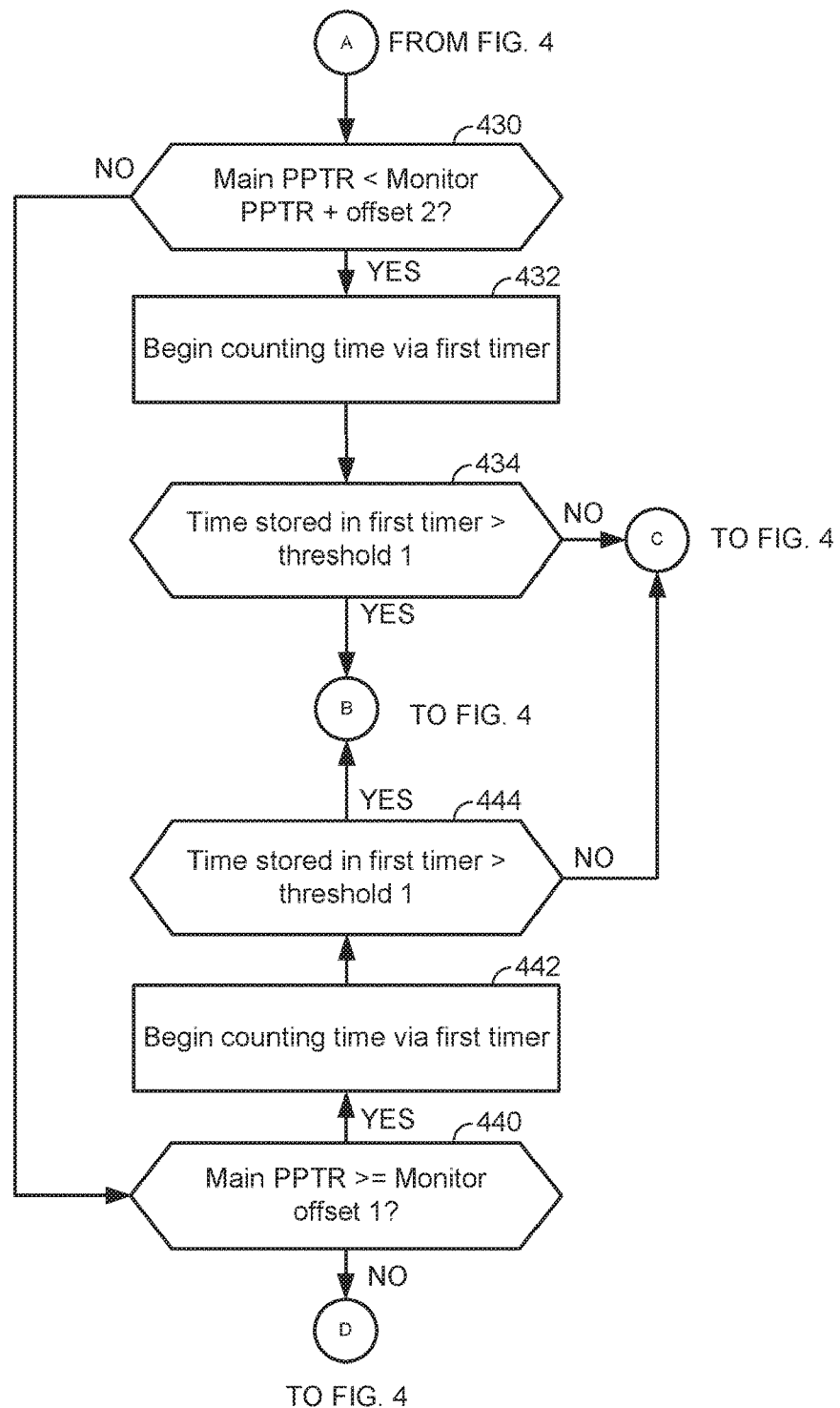
Figure 6:
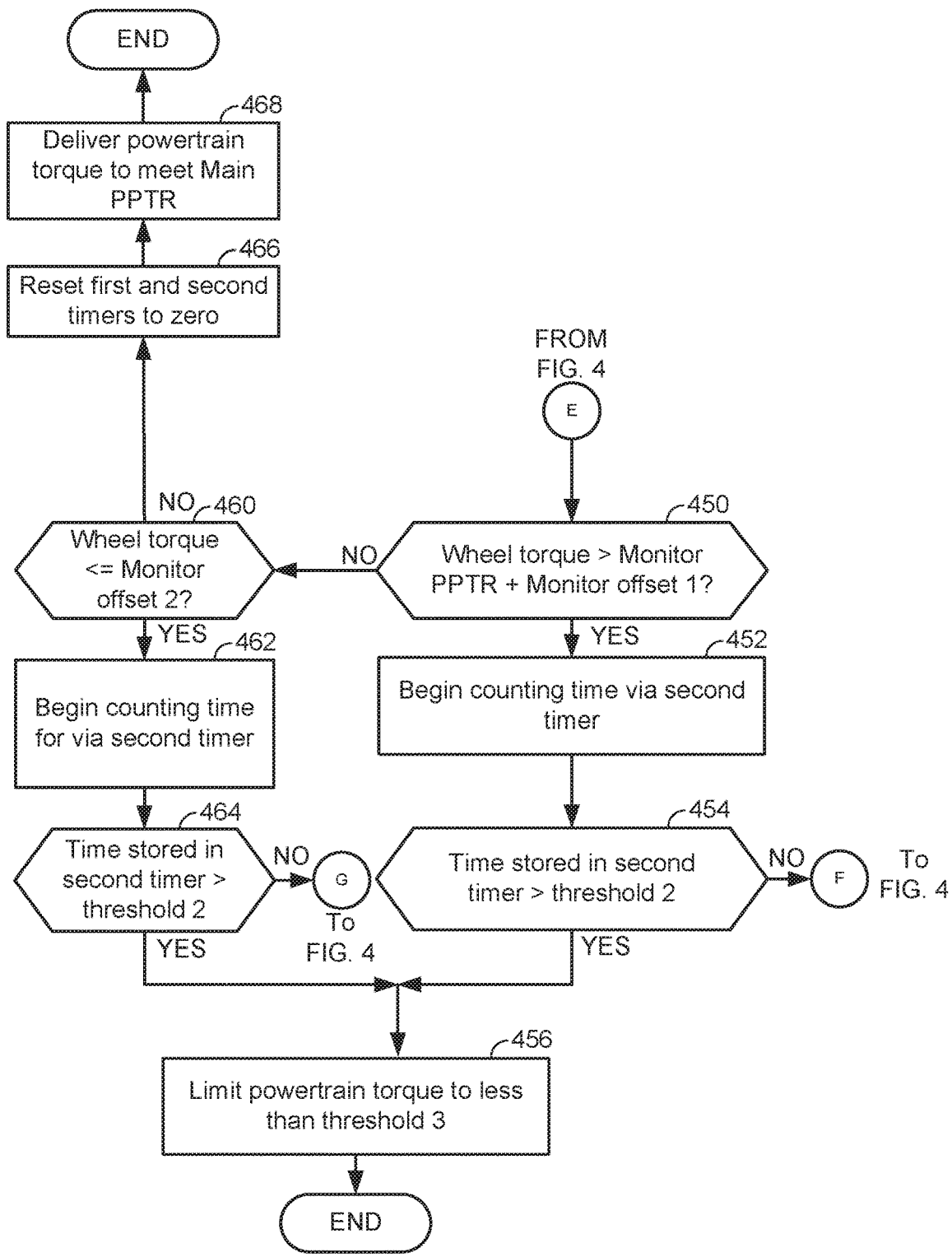
Figure 7:
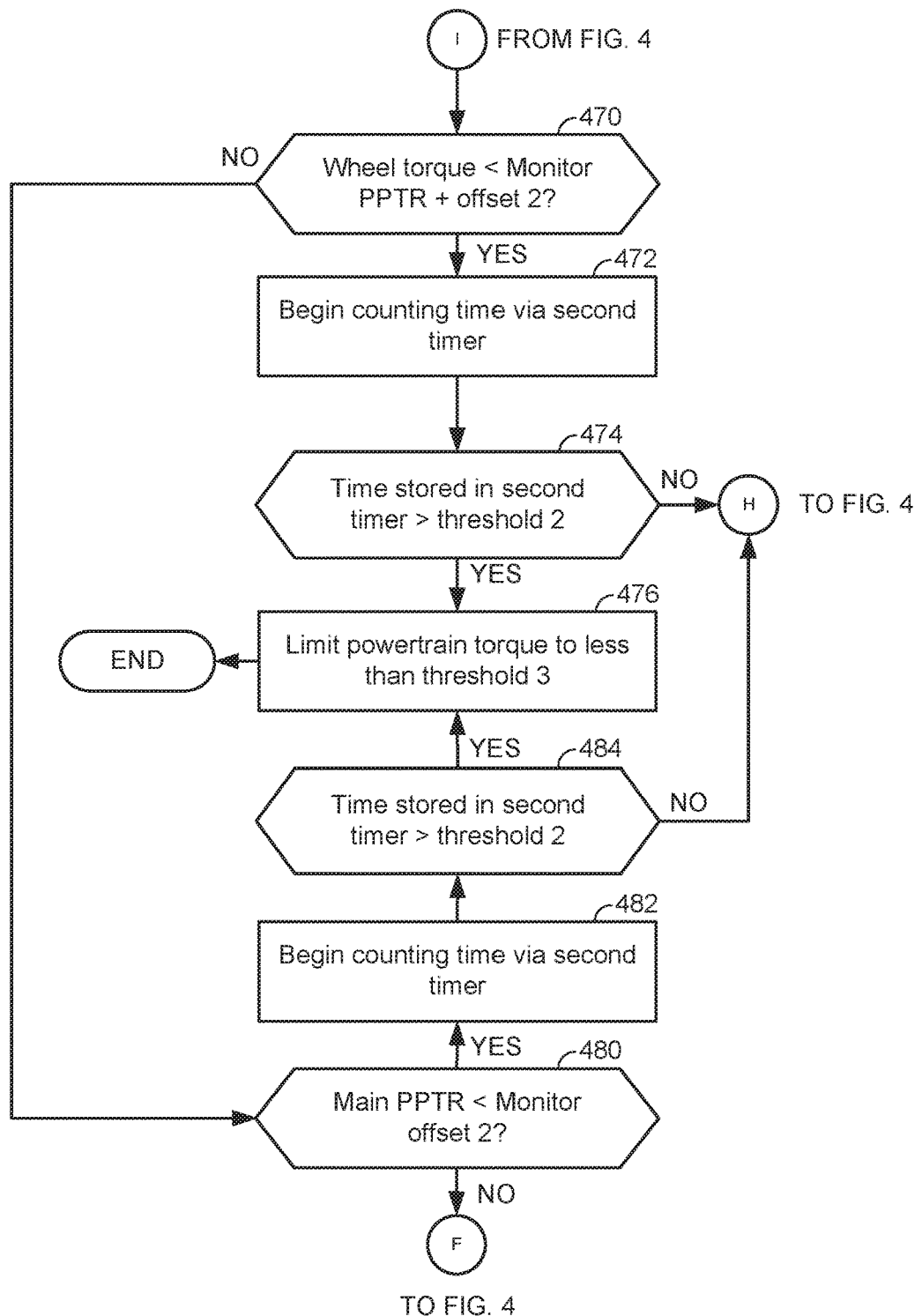

Turning now to FIG. 3, an example vehicle operating sequence is shown for monitoring and determining a propulsive effort request for a vehicle. The propulsive effort request may also be referred to as a driver demand torque or a driver demand power. The sequence of FIG. 3 may be provided via the system of FIGS. 1 and 2 in cooperation with the method of FIGS. 4-7. The plots of FIG. 3 are aligned in time. The vertical lines represent times of interest during the sequence.

The first plot from the top of FIG. 3 is a plot of a main propulsive effort pedal torque or power request (PPTR) versus time, which may also be referred to as propulsive effort request. The vertical axis represents main PPTR and main PPTR increases in the direction of the vertical axis arrow. The horizontal axis represents time and time increases from the left side of the figure to the right side of the figure. Trace 302 represents the main PPTR. The powertrain output torque or power (e.g., torque or power that is provided to the vehicle's wheels via the engine and/or electric machine) may be set to the value of the main PPTR.

The second plot from the top of FIG. 3 is a plot of monitor PPTR (e.g., a monitor propulsive effort request) versus time. In one example, the monitor PPTR value is determined as described in method 400. The monitor PPTR value may be the basis for determining whether or not the main PPTR value is within an expected range of values. The vertical axis represents the monitor PPTR and monitor PPTR increases in the direction of the vertical axis arrow. The horizontal axis represents time and time increases from the left side of the figure to the right side of the figure. Trace 304 represents the monitor PPTR.

The third plot from the top of FIG. 3 is a plot of wheel torque versus time. In one example, the wheel torque value is determined as described in method 400. The wheel torque value may be the basis for determining whether or not the main PPTR value is within an expected range. The vertical axis represents the wheel torque and wheel torque increases in the direction of the vertical axis arrow. The horizontal axis represents time and time increases from the left side of the figure to the right side of the figure. Trace 306 represents the wheel torque.

The fourth plot from the top of FIG. 3 is a plot of a value of a first timer versus time. In one example, the value of the first timer may be a basis for activating a second timer and indicating that the main PPTR value has not passed a first plausibility check or evaluation. The vertical axis represents the value of the first timer (e.g., a value stored in the first timer) and the value of the first timer increases in the direction of the vertical axis arrow. The horizontal axis represents time and time increases from the left side of the figure to the right side of the figure. Trace 308 represents the value of the first timer. Horizontal line 350 represents a threshold amount of time for indicating whether or not the main PPTR value is within an expected range. If trace 308 exceeds the level of horizontal line 350, the second timer may be started and it may be determined that the main PPTR has not been within an expected range.

The fifth plot from the top of FIG. 3 is a plot of a value of a second timer versus time. In one example, the value of the second timer may be a basis for determine and indicating that the wheel torque value has not passed a second plausibility check or evaluation. The vertical axis represents the value of the second timer and the value of the second timer increases in the direction of the vertical axis arrow. The horizontal axis represents time and time increases from the left side of the figure to the right side of the figure. Trace 310 represents the value of the second timer. Horizontal line 352 represents a threshold amount of time for indicating whether or not the wheel torque is within an expected range. If trace 310 exceeds the level of horizontal line 352, it may be determined that the powertrain may not be commanded to provide the torque or power requested via the main PPTR. The first and second timers allow brief differences between the main PPTR and the monitor PPTR to exist before the powertrain torque is limited.

The sixth plot from the top of FIG. 3 is a plot of powertrain torque output versus time. The vertical axis represents the powertrain output torque and the powertrain output torque increases in the direction of the vertical axis arrow. The horizontal axis represents time and time increases from the left side of the figure to the right side of the figure. Trace 312 represents the powertrain output torque.

At time t0, the main PPTR is at a middle level and it is gradually increasing. The monitor PPTR and the wheel torque values are equal to the main PPTR value. The values in timers one and two are zero. The powertrain output torque is equal to the main PPTR.

Between time t0 and time t1, the main PPTR continues increasing, but it starts to be reduced just before time t1. The monitor PPTR and wheel torque follow the main PPTR. In addition, the powertrain torque follows the main PPTR. The values in timer one and timer two are zero.

At time t1, the monitor PPTR value diverges from the value of the main PPTR. The wheel torque and the powertrain torque continue to follow the main PPTR. Since the monitor PPTR is less than the main PPTR by more than a predetermined amount, timer one is started and the value stored in timer one begins to increase. Timer two is not activated.

At time t2, the monitor PPTR value continues to diverge from the value of the main PPTR. The wheel torque and the powertrain torque continue to follow the main PPTR. Since the monitor PPTR is less than the main PPTR by more than a predetermined amount and the value stored in timer one exceeds threshold 350, timer two is started and the value stored in timer two begins to increase.

At time t3, the monitor PPTR value remains divergent from the value of the main PPTR. The values stored in timer two now exceeds threshold 352, so the powertrain output torque is limited to a predetermined torque (e.g., a creep torque). The wheel torque also is limited to the predetermined torque PPTR.

In this way, a main PPTR value may be assessed via other system parameter values. If the main PPTR value is not within predetermined expected values or levels, powertrain torque may be reduced to a predetermined amount of torque (e.g., a creep torque) so that a driver may experience less than expected torque or power levels from the powertrain. In addition, the approach allows the vehicle operator to navigate the vehicle to a road side or other place where the vehicle may not be in the path of other vehicles so that the vehicle may be serviced.

Referring now to FIGS. 4-7, a high level flow chart of an example method 400 for determining and monitoring a vehicle torque request is shown. The method of FIGS. 4-7 may be incorporated into the system of FIGS. 1 and 2 as executable instructions stored in controller non-transitory memory. In addition, other portions of method 400 may be performed via a controller transforming operating states of devices and actuators in the physical world. The controller may employ engine actuators of the engine system to adjust engine operation.

At 402, method 400 determines operating conditions. The engine and vehicle operating conditions may be determined via the sensors and actuators described herein. In one example, the operating conditions may include put are not limited to ambient temperature, ambient pressure, engine temperature, engine speed, vehicle speed, selected transmission gear, and propulsive effort pedal position. Method 400 proceeds to 404.

At 404, method 400 determines a main propulsive effort pedal torque request (PPTR). In one example, the value of the main PPTR may be a function of several parameters including vehicle speed, propulsive effort pedal position, selected transmission gear, and vehicle mode (e.g., cruise control, torque control, hill descent, etc.). In one example, PPTR may be determined via referencing a table or function that outputs a torque or power level. Values in the table may be empirically determined via operating a vehicle on a dynamometer and adjusting torque or power levels for a given propulsive effort pedal position until a desired vehicle response is provided. The table may be referenced via propulsive effort pedal position and vehicle speed. In addition, the output of the table may be adjusted according to a transmission gear selection. For example, if a transmission is selected to be in a forward gear while the propulsive effort pedal is fully released, a first predetermined offset torque or power (e.g., 4 Newton-meters) may be added to the output from the table. However, if the transmission is selected to be in neutral while the propulsive effort pedal is fully released, a second predetermined offset torque or power (e.g., zero Newton-meters) may be added to the output of the table. These torque or power offsets allow engine speed to be maintained when shifting into gears. Similar torque or power offsets or table look values for vehicle mode, simulated transmission gears, and torque/power blending features may be added to the output of the table that is indexed or referenced via propulsive effort pedal position and vehicle speed. Method 400 proceeds to 406.

At 406, method determines the monitor PPTR and the wheel torque. The monitor PPTR may be determined independently from the main PPTR and it may be constrained to minimum and maximum threshold values. The wheel torque may be determined via from estimates of engine torque, electric machine torque, and engaged transmission gear. Method 400 proceeds to 408.

At 408, method 400 judges if the monitor PPTR is greater than or equal to zero. A monitor PPTR value greater than zero may be an indication that an increase in vehicle speed is requested. A monitor PPTR value less than zero may be an indication that a decrease in vehicle speed is requested. If method 400 judges that the monitor PPTR value is greater than zero, the answer is yes and method 400 proceeds to 410. Otherwise, the answer is no and method 400 proceeds to 430.

Steps 408-414, 420-424, 430-444 form a first plausibility check that evaluates the main PPTR value relative to the monitor PPTR value, threshold values, and offset values. Similarly, steps 416 and 450-480 form a second plausibility check that evaluates the wheel torque value relative to the monitor PPTR value, threshold values, and offset values.

At 430, method 400 judges if the main PPTR is less than the monitor PPTR plus STM_APTR_ERR_MIN. This condition determines if the main PPTR value is requesting a torque that is less than the monitor PPTR plus an offset (e.g., offset 2 or STM_APTR_ERR_MIN) torque or power. In one example, the value of STM_APTR_ERR_MIN is based on constraining vehicle speed reduction to less than 0.2 g, where g is the gravitational constant. If method 400 judges that the main PPTR is less than the monitor PPTR value plus STM_APTR_ERR_MIN, then the answer is yes and method 400 proceeds to 432. The offset values described herein may be predetermined amounts or values. Otherwise, the answer is no and method 400 proceeds to 440.

At 432, method 400 begins incrementing a value stored in a first timer. Method 400 proceeds to 434.

At 434, method 400 judges if the value stored in the first timer is greater than a first threshold amount of time (e.g., 750 milliseconds). If so, the answer is yes and method 400 proceeds to 416. Otherwise, the answer is no and method 400 returns to 408. Method 400 may repeatedly loop from 434 to 408 until the value stored in timer 1 exceeds the first threshold. However, if conditions change and the main PPTR is not less than the monitor PPTR plus STM_APTR_ERR_MIN, then method 400 may exit via 410, 420, 426, and 428. A value of timer 1 exceeding the first threshold may indicate that the first plausibility check has determined that there is a possibility that the propulsion request is degraded.

At 440, method 400 judges if the value of the main PPTR value is greater than or equal to the value of STM_APTR_ERR_MAX. This condition determines if the main PPTR value is requesting a torque that is greater than a first offset (e.g., offset 1). In one example, the value of variable STM_APTR_ERR_MAX is based on predetermined standards. If method 400 judges that the main PPTR is greater than or equal to the first offset (e.g., STM_APTR_ERR_MAX), then the answer is yes and method 400 proceeds to 442. Otherwise, the answer is no and method 400 proceeds to 426.

At 442, method 400 begins incrementing a value stored in a first timer. Method 400 proceeds to 444.

At 444, method 400 judges if the value stored in the first timer is greater than a first threshold amount of time (e.g., 750 milliseconds). If so, the answer is yes and method 400 proceeds to 416. Otherwise, the answer is no and method 400 returns to 408. Method 400 may repeatedly loop from 444 to 408 until the value stored in timer 1 exceeds the first threshold. However, if conditions change and the main PPTR is not greater than the monitor PPTR plus STM_APTR_ERR_MAX, then method 400 may exit via 410, 420, 426, and 428.

At 410, method 400 judges if the main PPTR is greater than the monitor PPTR plus STM_APTR_ERR_MAX. This condition determines if the main PPTR value is requesting a torque that is greater than the monitor PPTR plus a first offset (e.g., offset 1 or STM_APTR_ERR_MAX). If method 400 judges that the main PPTR is greater than the monitor PPTR value plus STM_APTR_ERR_MAX, then the answer is yes and method 400 proceeds to 412. Otherwise, the answer is no and method 400 proceeds to 420.

At 412, method 400 begins incrementing a value stored in a first timer. Method 400 proceeds to 414.

At 414, method 400 judges if the value stored in the first timer is greater than a first threshold amount of time (e.g., 750 milliseconds). If so, the answer is yes and method 400 proceeds to 416. Otherwise, the answer is no and method 400 returns to 408. Method 400 may repeatedly loop from 414 to 408 until the value stored in timer 1 exceeds the first threshold. However, if conditions change and the main PPTR is not greater than the monitor PPTR plus STM_APTR_ERR_MAX, then method 400 may exit via 410, 420, 426, and 428.

At 420, method 400 judges if the value of the main PPTR is less than or equal to the value of STM_APTR_ERR_MIN. This condition determines if the main PPTR value is requesting a torque that is less than a second offset (e.g., offset 2). If method 400 judges that the main PPTR is less than the second offset (e.g., STM_APTR_ERR_MIN), then the answer is yes and method 400 proceeds to 422. Otherwise, the answer is no and method 400 proceeds to 426.

At 426, method 400 resets values stored in the first timer and the second timer to zero. Method 400 proceeds to 428. The timer values are reset to zero in case the main PPTR value disagreed with the monitor PPTR value for a short period of time.

At 428, method 400 adjusts powertrain torque to meet the value of the main PPTR. If the vehicle is presently operating under power of only an electric machine, output of the electric machine is adjusted so that the powertrain provides the value in the main PPTR. If the vehicle is presently operating under power of only an engine, output of the engine is adjusted so that the powertrain provides the value in the main PPTR. If the vehicle is presently operating under power of an electric machine and an engine, output of the electric machine and the engine is adjusted so that the powertrain provides the value in the main PPTR. The main PPTR may be delivered via the powertrain in the form of a wheel torque or a torque or power at another location along the powertrain. Method 400 proceeds to exit.

At 422, method 400 begins incrementing a value stored in a first timer. Method 400 proceeds to 424.

At 424, method 400 judges if the value stored in the first timer is greater than the first threshold amount of time. If so, the answer is yes and method 400 proceeds to 416. Otherwise, the answer is no and method 400 returns to 408. Method 400 may repeatedly loop from 424 to 408 until the value stored in timer 1 exceeds the first threshold. However, if conditions change and the main PPTR is not less than the second offset STM_APTR_ERR_MIN, then method 400 may exit via 410, 420, 426, and 428.

At 416, method 400 judges if the monitor PPTR is greater than or equal to zero. If method 400 judges that the monitor PPTR value is greater than zero, the answer is yes and method 400 proceeds to 450. Otherwise, the answer is no and method 400 proceeds to 470.

At 450, method 400 judges if wheel torque is greater than the monitor PPTR plus STM_APTR_ERR_MAX. This condition determines if the wheel torque value is greater than the monitor PPTR plus the first offset (e.g., offset 1 or STM_APTR_ERR_MAX). In one example, the value of STM_APTR_ERR_MAX may be based on predetermined vehicle standards. If method 400 judges that the wheel torque value is greater than the monitor PPTR value plus STM_APTR_ERR_MAX, then the answer is yes and method 400 proceeds to 452. Otherwise, the answer is no and method 400 proceeds to 460.

At 452, method 400 begins incrementing a value stored in a second timer. Method 400 proceeds to 454.

At 454, method 400 judges if the value stored in the second timer is greater than a second threshold amount of time (e.g., 750 milliseconds). If so, the answer is yes and method 400 proceeds to 456. Otherwise, the answer is no and method 400 returns to 408. Method 400 may repeatedly loop from 454 to 408 until the value stored in timer 2 exceeds the second threshold. However, if conditions change and the wheel torque is not greater than the monitor PPTR plus STM_APTR_ERR_MAX, then method 400 may exit via 410, 420, 426, and 428.

At 456, method 400 limits torque output of the powertrain to less than a third threshold. For example, if the main PPTR value is 100 Newton-meters (Nm) and the fifth threshold is a creep torque of 5 Nm, the powertrain output torque may not exceed 5 Nm. The powertrain torque may be delivered via the powertrain in the form of a wheel torque or a torque or power at another location along the powertrain. In addition, method 400 may provide a visual or audible indication via a human/machine interface that powertrain output is being limited. Method 400 proceeds to exit.

At 460, method 400 judges if the value of the wheel torque value is less than or equal to the value of STM_APTR_ERR_MIN. This condition determines if the wheel torque value is requesting a torque that is less than a second offset (e.g., offset 2). If method 400 judges that the wheel torque is less than the second offset (e.g., STM_APTR_ERR_MIN), then the answer is yes and method 400 proceeds to 462. Otherwise, the answer is no and method 400 proceeds to 466.

At 466, method 400 resets values stored in the first timer and the second timer to zero. Method 400 proceeds to 468. The timer values are reset to zero in case the wheel torque value disagreed with the monitor PPTR value for a short period of time.

At 468, method 400 adjusts powertrain torque to meet the value of the main PPTR. If the vehicle is presently operating under power of only an electric machine, output of the electric machine is adjusted so that the powertrain provides the value in the main PPTR. If the vehicle is presently operating under power of only an engine, output of the engine is adjusted so that the powertrain provides the value in the main PPTR. If the vehicle is presently operating under power of an electric machine and an engine, output of the electric machine and the engine is adjusted so that the powertrain provides the value in the main PPTR. The main PPTR may be delivered via the powertrain in the form of a wheel torque or a torque or power at another location along the powertrain. Method 400 proceeds to exit.

At 462, method 400 begins incrementing a value stored in a second timer. Method 400 proceeds to 464.

At 464, method 400 judges if the value stored in the second timer is greater than the second threshold amount of time. If so, the answer is yes and method 400 proceeds to 456. Otherwise, the answer is no and method 400 returns to 408. Method 400 may repeatedly loop from 464 to 408 until the value stored in timer 2 exceeds the fourth threshold. However, if conditions change and the wheel torque is not less than the second threshold STM_APTR_ERR_MIN, then method 400 may exit via 410, 420, 426, and 428.

At 470, method 400 judges if the wheel torque is less than the monitor PPTR plus STM_APTR_ERR_MIN. This condition determines if the wheel torque is less than the monitor PPTR plus the second offset (e.g., offset 2 or STM_APTR_ERR_MIN). If method 400 judges that the wheel torque is less than the monitor PPTR value plus STM_APTR_ERR_MIN, then the answer is yes and method 400 proceeds to 472. Otherwise, the answer is no and method 400 proceeds to 480.

At 472, method 400 begins incrementing a value stored in a first timer. Method 400 proceeds to 474.

At 474, method 400 judges if the value stored in the second timer is greater than a second threshold amount of time (e.g., 750 milliseconds). If so, the answer is yes and method 400 proceeds to 476. Otherwise, the answer is no and method 400 returns to 408. Method 400 may repeatedly loop from 474 to 408 until the value stored in timer 2 exceeds the second threshold. However, if conditions change and the wheel torque is not less than the monitor PPTR plus STM_APTR_ERR_MIN, then method 400 may exit via 410, 420, 426, and 428.

At 476, method 400 limits torque output of the powertrain to less than a third threshold. For example, if the main PPTR value is 100 Newton-meters (Nm) and the fifth threshold is a creep torque of 5 Nm, the powertrain output torque may not exceed 5 Nm. The powertrain torque may be delivered via the powertrain in the form of a wheel torque or a torque or power at another location along the powertrain. In addition, method 400 may provide a visual or audible indication via a human/machine interface that powertrain output is being limited. Method 400 proceeds to exit.

At 480, method 400 judges if the value of the wheel torque is greater than or equal to the value of STM_APTR_ERR_MAX. This condition determines if the wheel torque is greater than a second offset (e.g., offset 2). If method 400 judges that the wheel torque is greater than or equal to the second offset (e.g., STM_APTR_ERR_MAX), then the answer is yes and method 400 proceeds to 482. Otherwise, the answer is no and method 400 proceeds to 426.

At 482, method 400 begins incrementing a value stored in a second timer. Method 400 proceeds to 484.

At 484, method 400 judges if the value stored in the second timer is greater than a second threshold amount of time (e.g., 750 milliseconds). If so, the answer is yes and method 400 proceeds to 476. Otherwise, the answer is no and method 400 returns to 408. Method 400 may repeatedly loop from 484 to 408 until the value stored in timer 2 exceeds the second threshold. However, if conditions change and the wheel torque is not less than the monitor PPTR plus STM_APTR_ERR_MIN, then method 400 may exit via 410, 420, 426, and 428.

In this way, a main PPTR may be evaluated or compared against a monitor PPTR to determine if the main PPTR value is an expected value. Further, wheel torque is compared against the monitor PPTR to provide an additional level of confidence when determining whether or not the main PPTR value meets expectations. If the main PPTR value meets expectations, the powertrain is commanded to the value of the main PPTR. If the main PPTR value does not meet expectations, the powertrain is commanded to a predetermined value (e.g., a creep torque) independent of the main PPTR value and the propulsive effort pedal position.

Thus, the method of FIGS. 4-7 provides for a method for operating a vehicle, comprising: evaluating a propulsive effort request according to a first plausibility check; evaluating the propulsive effort request via a second plausibility check when the first plausibility check indicates a possibility of the propulsive effort request being degraded; and constraining powertrain output to less than a first predetermined amount in response to results of the first plausibility check. The method includes where the first plausibility check includes judging that the propulsive effort request is greater than a monitor propulsive effort request by more than a second predetermined amount, and incrementing a timer after judging that the propulsive effort request is greater than the monitor propulsive effort request by more than the second predetermined amount.

The method of FIGS. 4-7 also provides for resetting the timer to a value of zero in response to judging that the propulsive effort request is not greater than the monitor propulsive effort request by more than the second predetermined amount. The method includes where the propulsive effort request is based on a position of a propulsion pedal. The method includes where the propulsive effort request is further based on a position of a gear shift lever or a paddle shifter input. The method includes where the propulsive effort request is further based on an operating state of a cruise control system of a vehicle. The method includes where the first predetermined amount is a creep torque. The method further comprises providing an indication to a vehicle operator that powertrain output is constrained in response to a value of the timer exceeding the second predetermined amount.

The method of FIGS. 4-7 also provides for a method for operating a vehicle, comprising: judging that a propulsive effort request is greater than a monitor propulsive effort request by more than a first predetermined amount; incrementing a first timer after judging that the propulsive effort request is greater than the monitor propulsive effort request by more than the first predetermined amount; judging that a wheel torque is greater than a monitor propulsive effort request by more than the first predetermined amount; incrementing a second timer after judging that the wheel torque is greater than the monitor propulsive effort request by more than the first predetermined amount; and constraining powertrain output to less than a second predetermined amount in response to a value of the second timer exceeding a third predetermined amount. The method includes where the third predetermined amount is a creep torque. The method further comprises providing an indication to an operator in response to the value of the second timer exceeding the second predetermined amount. The method further comprises providing the propulsive effort request to propel a vehicle via a powertrain in response to judging that the propulsive effort request is not greater than the monitor propulsive effort request by more than the first predetermined amount. The method further comprises resetting a value of the first timer to zero in response to judging that the propulsive effort request is not greater than the monitor propulsive effort request by more than the first predetermined amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
   judging that a propulsive effort request is greater than a monitor propulsive effort request by more than a first predetermined amount;
   incrementing a first timer after judging that the propulsive effort request is greater than the monitor propulsive effort request by more than the first predetermined amount;

judging that a wheel torque is greater than the monitor propulsive effort request by more than the first predetermined amount;

incrementing a second timer after judging that the wheel torque is greater than the monitor propulsive effort request by more than the first predetermined amount; and constraining powertrain output to less than a second predetermined amount in response to a value of the second timer exceeding a third predetermined amount.

2. The method of claim 1, where the second predetermined amount is a creep torque.

3. The method of claim 1, further comprising providing an indication to an operator in response to the value of the second timer exceeding the third predetermined amount.

4. The method of claim 1, further comprising providing the propulsive effort request to propel a vehicle via a powertrain in response to judging that the propulsive effort request is not greater than the monitor propulsive effort request by more than the first predetermined amount.

5. The method of claim 1, further comprising resetting a value of the first timer to zero in response to judging that the propulsive effort request is not greater than the monitor propulsive effort request by more than the first predetermined amount.

* * * * *